June 13, 1961  D. F. WILHELM  2,988,682
LINE FOLLOWER SERVOSYSTEM
Filed March 10, 1958  4 Sheets-Sheet 2

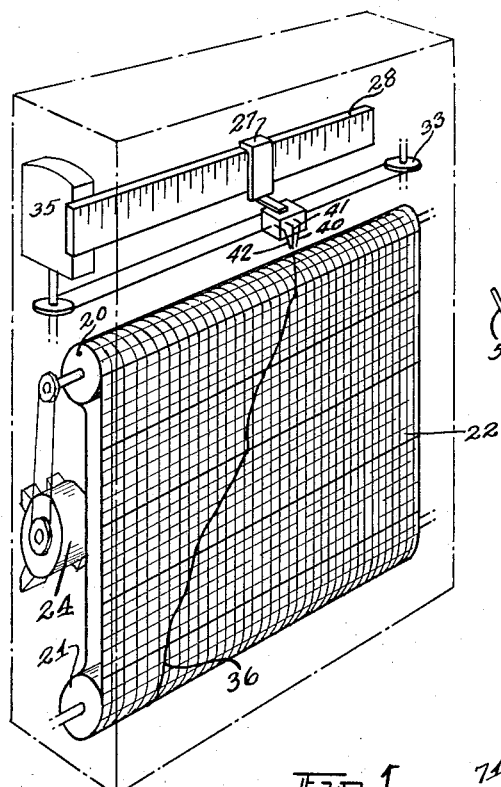

INVENTOR.
DONALD F. WILHELM
BY
Rule & Hoge,
ATTORNEYS

June 13, 1961
D. F. WILHELM
2,988,682
LINE FOLLOWER SERVOSYSTEM
Filed March 10, 1958
4 Sheets-Sheet 3
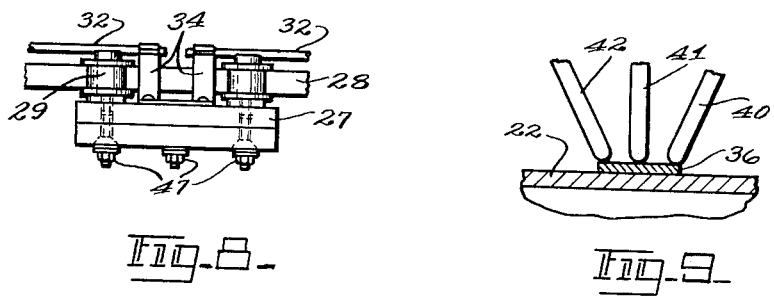
Fig. 8.
Fig. 9.
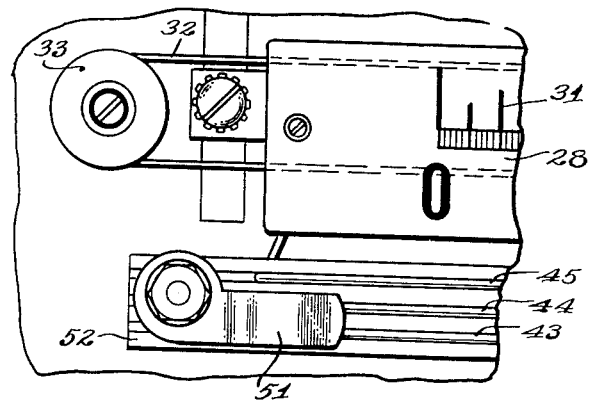
Fig. 10.
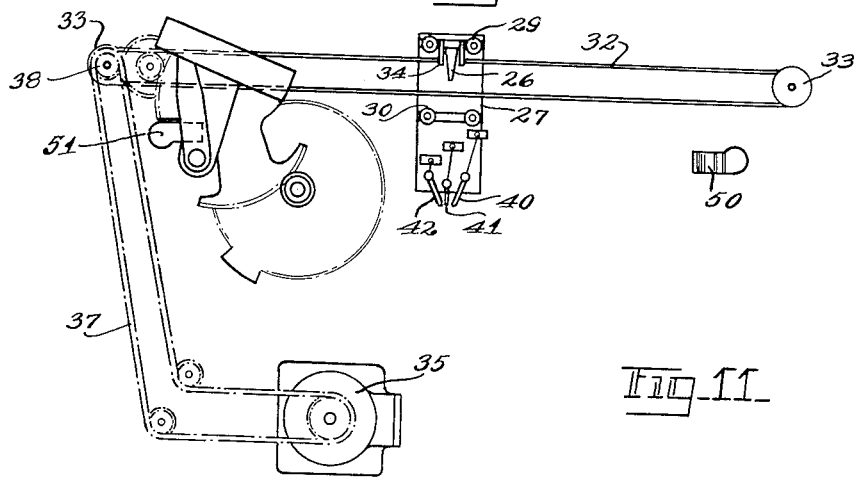
Fig. 11.
INVENTOR.
DONALD F. WILHELM
BY
Rule and Hoge,
ATTORNEYS June 13, 1961
D. F. WILHELM
2,988,682
LINE FOLLOWER SERVOSYSTEM
Filed March 10, 1958
4 Sheets-Sheet 4
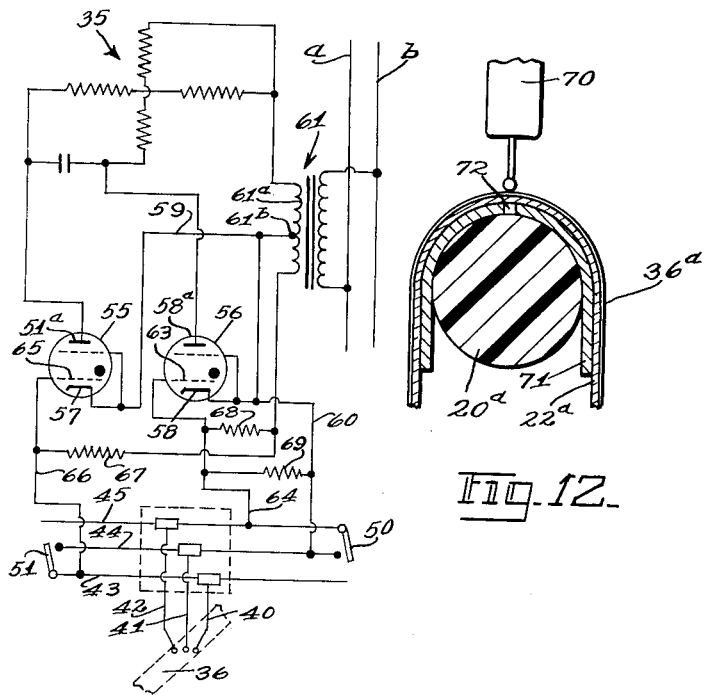
Fig. 12.
Fig. 14.
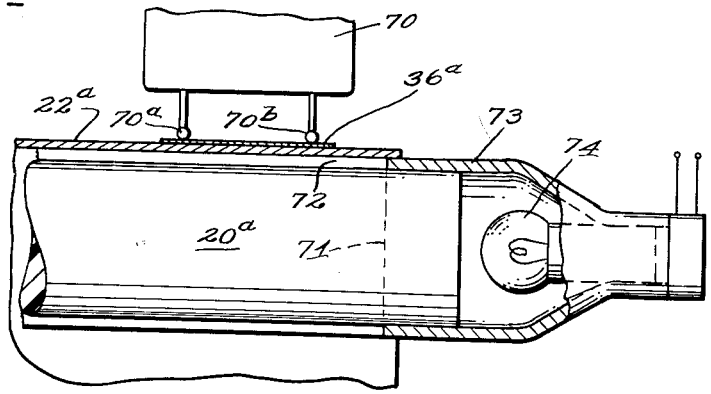
Fig. 13.
INVENTOR.
DONALD F. WILHELM
BY
Rule & Hoge.
ATTORNEYS United States Patent Office 2,988,682
Patented June 13, 1961

2,988,682
LINE FOLLOWER SERVOSYSTEM
Donald F. Wilhelm, Toledo, Ohio, assignor to Owens-Illinois Glass Company, a corporation of Ohio
Filed Mar. 10, 1958, Ser. No. 720,158
13 Claims. (Cl. 318—31)

My invention relates to methods and means for controlling any measurable variable with respect to time. The invention provides means for connecting a strip chart or circular chart instrument recorder of known construction to a program controller for controlling temperature or other variable functions of an operation to conform to a desired time program. The invention provides means for controlling measurable variables generally with respect to time, as, for example, variables of temperature, pressure, weight, volume, moisture, light and the like.

In a preferred method of practicing the invention a recording strip chart or circular chart instrument of known construction is converted to a program controller. In such conversion three electrical point contacts are mounted to ride on the chart paper and are moved along the scale by the usual carrier for the point indicator. A line of electrically conducting material such as a graphite pencil line or similar contact line is drawn on the paper to conform to the desired program or cycle. The electrical point contacts ride on the line to maintain an electrical circuit while the chart is being driven in the usual manner. When either of the outer contact points breaks connection with the contact line during the travel of the chart, an electric motor, having a control circuit extending through such contacts, is operated to drive the contact carrier in a direction to restore the circuit through such contacts. In this manner the point contact carrier is moved along the scale at a rate in keeping with the time program indicated by the markings on the chart. The movement of the contact carrier along the scale may be used to operate any control function or other means controlling any operation in keeping with the time program represented by the contact line on the chart.

In a modified form of the invention a photo-electric device is employed in which a photo-diode is used instead of the three electrical point contacts. In place of the conducting line on the chart, an opaque line is drawn on a translucent paper chart. The chart is driven by a roll formed of transparent or light transmitting material. The light is transmitted through a narrow slot in an opaque shield to the photo-diodes when not cut off by the opaque line. The motor for driving the point contact carrier and photo-electric device is controlled by said opaque line which cuts off the light to the photo cells and controls the operation of the motor in a manner to cause the point contact carrier to move along the scale in keeping with the time program represented by said opaque line.

Referring to the accompanying drawings:

FIG. 1 is a partly diagrammatic perspective view of a time chart recording instrument of known construction modified for use in practicing my invention.

FIG. 2 is a fragmentary wiring diagram for the control device used with the modified apparatus shown in FIG. 4.

FIG. 3 is a wiring diagram of the electrical circuits for the motor for driving the carrier for the set point indicator and the thyratrons controlling the operation of the motor.

FIG. 4 is a partly diagrammatic perspective view of a modified construction employing a photo-electric control device.

FIG. 8 is a detailed plan view of the contact carrier and its driving cable.

FIG. 9 is a view on a comparatively large scale showing the electrical contacts bridged by the conducting line on the chart.

FIG. 10 is a detailed view showing an end portion of the scale and a limit switch.

FIG. 11 is a diagrammatic view of the point contact carrier and mechanism for driving the same.

FIG. 12 is a cross sectional view of the light-transmitting roll and the photo-electric device of FIG. 4.

FIG. 13 is a part sectional front view of parts shown in FIG. 12.

FIG. 14 is a wiring diagram of the electrical system employing the electrical point contacts and including limit switches.

Figure 5:
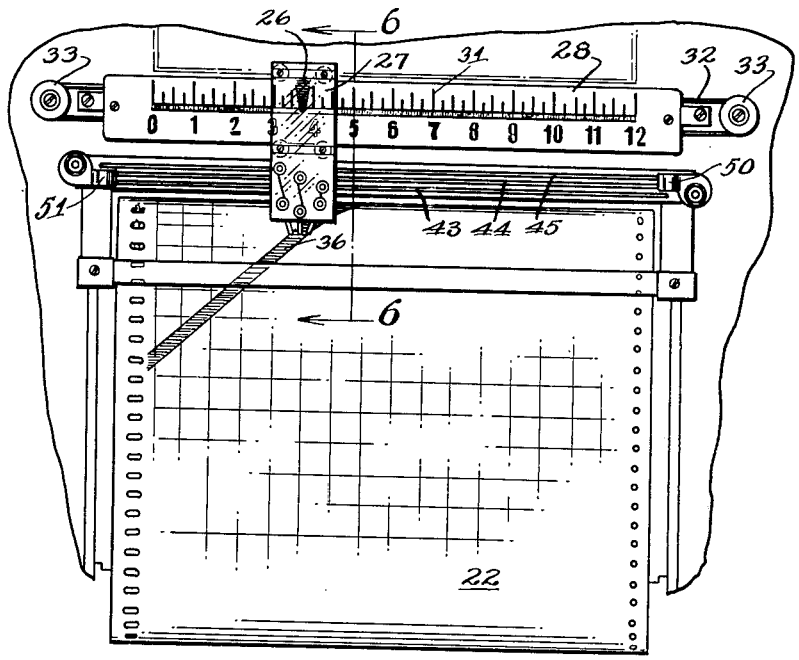
FIG. 5 is a front elevational view of the apparatus shown in FIG. 1, parts being broken away.

Referring particularly to FIGS. 1 and 5, a strip chart recording instrument of known construction, such as placed on the market by Brown Instrument Division of the Minneapolis-Honeywell Regular Co., Philadelphia, is shown as modified to adapt it for use with the present invention.

This instrument comprises an upper roll 20 and a lower roll 21 over which a chart 22 is trained. An electric motor 24 is geared to the roll 20 for driving the chart. A set point indicator comprising a pointer 26 (FIGS. 6 and 7) is attached to a carrier 27 mounted for travel along a stationary scale bar 28. The carrier is provided with rolls 29 and 30 running on the upper and lower edges of the scale bar for supporting and guiding the carrier. The scale bar is provided with the usual scale markings 31. The carrier 27 is connected by a bracket 34 (FIG. 8) to a cable 32 which is trained over rolls 33 near the ends of the scale bar.

In accordance with my invention, the cable is driven by an electric motor 35, under the control of an electric contact line 36 on the chart, as hereinafter described, for moving the carrier lengthwise of the scale. Operating connections between the motor 35 and the cable 32, as shown in FIG. 11, include an endless chain or belt 37 trained over the motor pully and a pully 38 on the drive shaft for the cable. The carrier 27 consists of transparent material through which the scale markings may be read.

Point contact rods 40, 41 and 42 are mounted on the carrier plate and project downwardly therefrom into position to bear on the chart 22. These wiper contact rods are spring loaded or resilient to maintain yielding contact with the chart. The contact points as shown are preferably in a horizontal line extending in the direction of their travel across the chart. Mounted on the frame of the recording instrument are three parallel electrically conducting rods 43, 44 and 45 which extend horizontally across the machine and have a stationary mounting thereon. These rods are electrically connected with the wiper rods 40, 41 and 42 respectively. The connections include links 46 bolted to the carrier plate and attached at their lower ends to the contact rods by bolts 47. The upper ends of the links 46 are connected, by bolts 48 extending through the carrier plate to wipers 49 attached to said bolts. The wipers 49 bear on the conducting bars 43, 44 and 45 respectively, having sliding contact with said bars during the travel of the carrier 27. Limit switches 50 and 51 (FIGS. 5, 10 and 14) are mounted at the opposite ends of the contact bars and are normally yieldingly held out of contact with the bars. The limit switch 50 is positioned to bridge the bars 44 and 45, being moved into closed positions by the carrier 27 when the latter approaches the limit of its movement to the right. The limit switch 51 in like manner bridges the bars 43 and 44 when the carrier reaches its limit of movement in the opposite direction. The purpose of these limit switches will be described hereinafter.

Figures 6, 7:
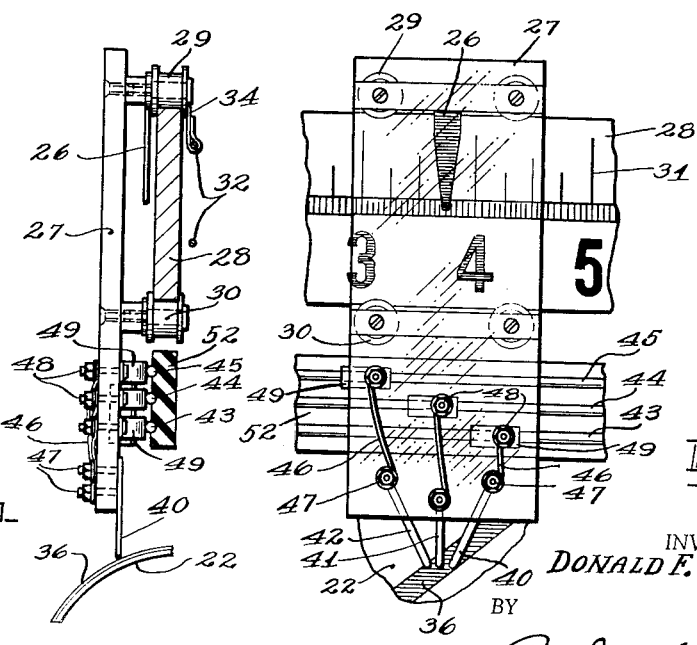
FIG. 6 is a section at the line 6—6 on FIG. 5, showing the carrier for the set point indicator and the wiper contacts.
FIG. 7 is a face view of the parts shown in FIG. 6.

The bars 43—45 are mounted on a plate 52 of insulating material. The contact line 36 consists of electrically conducting material. It may be drawn, for example, with a soft graphite pencil or may be applied with a speed ball pen and a solution of collodial graphite and alcohol, or other conducting materials may be used. This contact line is preferably made of substantial width, sufficient to bridge the three contact points as shown in FIGS. 7 and 9.

The electrical control system for the motor 35 which drives the carrier 27 with its wiper contacts 40, 41 and 42 will now be described by reference to the diagrams, FIGS. 3 and 14. This system employs thyratrons 55 and 56 in order to minimize the contact potential at the contact line 36 on the chart and thereby avoid sparking at the contacts.

Alternating current is supplied to the motor 35 through a transformer 61 having its primary connected to the mains $a$ and $b$ of an alternating current system. The secondary 61$^a$ of the transformer supplies an alternating voltage to the plate circuits of the tubes. The cathodes 57 and 58 of the respective thyratrons are connected together by a lead 59 and to the center wiper 41 through leads 59, 60 and the contact bar 44. The lead 59 is connected to the transformer secondary at the center point 61$^b$. The control grid 63 of the thyratron 56 is connected through a lead 64 and the rod 45 to the point contact rod 42. The control grid 65 of thyratron 55 is connected through a lead 66 and the rod 43 to the contact rod 40. Resistors 67 and 68 are connected between the transformer secondary and the control grids 65 and 63, respectively. The thyratrons are biased so that no current will flow through the tubes until the wipers make contact with the conducting line 36 and thereby reduce the grid bias to zero, allowing the tube to conduct. When, for example, the wipers 41 and 42 make contact with the line 36, they provide a short circuit between the leads 60 and 64 connected respectively to the cathode 58 and control grid 63 of tube 56. The grid bias is thus reduced to zero so that the tube conducts.

The secondary of the transformer supplies an alternating voltage to the plate circuits of the tubes, the two-phase induction motor 35 being the load in said circuits. The thyratron grid bias is kept out of phase with the voltage of the plate (58$^a$ or 57$^a$) so that current will flow only so long as the grid bias is zero. Thus, if one of the wiper contacts is off the contact line 36, as for example the contact 40, and in open circuit, the corresponding thyratron 55 de-ionizes so that current no longer flows and there is no excitation on that particular phase of the motor. The same is true with respect to the wiper contact 42 which, if off the line 36 and in open circuit, prevents the current flow through the other phase winding of the motor. When all three wiper contacts are on the contact line 36, both thyratrons will conduct and both phases of the motor will be excited, thereby freezing the motor. The width of the contact line 36 may vary and is not of great importance, as any deviation of the wiper contacts to either side of the line will cause current to flow in the corresponding phase and drive the wiper contacts in the direction to again contact the line 36. A resistor 69 is connected between the leads 60 and 64 and provides an unbalance between the tubes 55 and 56. This allows one tube to take over and permit the motor to drive the carrier 27 and wiper contacts to the end of the scale. If, for example, the carrier 27, as it completes to the left (FIGS. 5 and 14) the carrier, as it completes this movement, engages the limit switch 51 and closes it across the bars 43 and 44. This makes a short circuit across the leads 60 and 66, the same as the short circuit provided when the contacts 40 and 41 are on the line 36, so that the motor is reversed and thereby drives the carrier to the right until the wiper contacts are once more on the line 36. The limit switch 50 is operated in like manner to short circuit the bars 45 and 44 when the carrier 27 is driven to the right and thus reverse the motor.

It will be apparent from the above description that the carrier 27 will be moved by the motor 35 along the scale bar during the travel of the chart in a manner to maintain the wiper contacts on the contact line 36. The movements of the carrier thus correspond to the time cycle represented by the line 36. This movement is utilized to control any measurable value with respect to time. For example, a thermostat may be connected to the carrier for movement therewith to control and vary temperature in keeping with the time cycle represented by the contact line 36. As a specific example, the thermostat may be used for controlling the temperature at which a glass article is being annealed. During such an annealing operation the required annealing temperature changes during the annealing operation. The required temperature and temperature variations moreover depend upon the particular articles or material being annealed. With the present invention, the contact line 36 may be so drawn as to maintain the article at any desired annealing temperature for any specified length of time and also may gradually reduce such temperature in keeping with the time program required for satisfactory annealing.

The invention may also be employed for controlling various other heat-treating operations in keeping with a desired time cycle, as, for example, for baking and other cooking processes and numerous other heat-treating processes. The invention may likewise be used for controlling pressure or other forces which are employed in accordance with a time program. The invention may be used in a similar manner for light control, for controlling the level of a liquid and in numerous other situations calling for a time control of a variable force or other variable function.

FIGS. 2, 4, 12 and 13 illustrate a modification in which a photo-diode 70, comprising photo cells 70$^a$ and 70$^b$, is attached to the point contact carrier 27. The device 70 cooperates with the line or strip 36$^a$ of opaque material corresponding generally to the line 36 in contour and in its function of controlling the operation of the motor which drives the carrier. In this construction the upper roll 20$^a$ over which a transparent chart 22$^a$ is trained, is made of transparent material, as for example methacrylate or any plastic material capable of transmitting light. A stationary shield 71 of opaque material extends over the roll 20$^a$ and is formed with a narrow slot 72 extending lengthwise of the roll through which the light is transmitted.

An electric light bulb 74 is mounted in a shell 73 fitted on the end of the roll 20$^a$. Light from this lamp or other light source is transmitted through the transparent roll 20$^a$ and the slot 72. While the cells 70$^a$ and 70$^b$ remain on the opaque strip 36$^a$ they are shielded from the light. When either cell runs off the strip 36$^a$ it is illuminated by the light transmitted through the slot 72 directly thereunderneath. This produces a voltage controlling the operation of one of the thyratrons. If, for example, the cell 70$^a$ moves off the strip 36$^a$ a voltage is established between the bars 44 and 45. This voltage transmitted to the leads 60 and 66 operates to fire the thyratron 55 so that the motor 35 is operated in a direction to return the photo-diode and again cut off light to the cell 70$^a$. If the cell 70$^b$ runs off the opaque strip 36$^a$ the motor 35 is operated under the control of the thyratron 56 to return the photo-diode. In this manner the photo-diode and its carrier 27 are caused to move, in keeping with the time program represented by the strip 36$^a$.

Modifications may be resorted to within the spirit and scope of my invention as defined in the appended claims.

I claim:

1. Apparatus for controlling an operation in keeping with a pre-determined time program, said apparatus comprising a chart, means forming a program control line on the chart of a shape corresponding to the time program, means for advancing the chart and the control line thereon in one direction, a carrier mounted for movement in directions transverse to the direction of movement of the chart, a motor drivingly coupled to said carrier, electro-responsive means laterally spaced on the carrier and co-operating with said line for controlling the operation of the motor and causing the carrier to follow said line, and means operative when said electro-responsive means is out of cooperative relationship with said control line for causing said motor to drive said carrier to one side of said chart.

2. Apparatus as defined in claim 1 including reversing switches adjacent the sides of said chart operable by said carrier to reverse the direction of said motor and said carrier to return said electro-responsive means into co-operative relationship with respect to said control line.

3. Apparatus for controlling an operation in keeping with a pre-determined time program, said apparatus comprising a chart, means for driving the chart in one direction, a line of electrically conducting material extending along the face of the chart and of a shape to correspond with the said time program, electrical point contact wipers comprising point contacts arranged in a row transverse to the direction of movement of a chart, said control line being of a width to bridge said contacts, a carrier for said wipers, an electric motor drivingly coupled to the carrier, said carrier mounted for movement along the chart in directions transverse to the direction of movement of the chart, and an electrical control system for the motor including said contact wipers and controlling the operation of the motor and causing said wipers to follow the said control line.

4. The apparatus defined in claim 3, the said control system comprising thyratrons in circuit with said point contacts and controlling the direction of operation of the motor.

5. The combination of a chart, means for driving the chart in one direction, means forming a time program control line on the chart and extending along one surface thereof, a two-phase electric motor, a carrier mounted for travel along the chart transversely of said direction of movement of the chart, means providing driving connections between said carrier and motor, thyratrons, the motor having phase windings in the plate circuits of the thyratrons respectively, laterally spaced electro-responsive means carried by said carrier and adapted to cooperate with said control line, said electro-responsive means operable to control the operation of the thyratrons and thereby control the motor and operate it in directions to cause said laterally spaced electro-responsive means to move along the control line.

6. The combination defined in claim 5 further including unbalancing means in the grid circuit of one of said thyratrons to cause one of said thyratrons to conduct so that said motor drives said carrier in one direction.

7. The combination defined in claim 6 further including means limiting said carrier to movement between the extremities of said chart transverse to the direction of movement thereof, including switch means for reversing the operation of said motor to drive said carrier in a direction reverse to said one direction.

8. The apparatus defined in claim 5, the said electro-responsive means comprising point contacts narrowly spaced in a direction transverse to the direction of movement of the chart, said control line being of a width to span said contacts and consisting of electrically conductive material.

9. The apparatus defined in claim 5, the said control line consisting of opaque material, the said electro-responsive means comprising photo-sensitive devices adapted to cooperate with said control line.

10. Apparatus for controlling an operation in keeping with a pre-determined time program, said apparatus comprising a transparent chart, means for driving the chart in one direction including a roll formed of light transmitting material and over which the chart is trained, a stationary shield consisting of opaque sheet material interposed between the said roll and the chart, said shield formed with a slot extending lengthwise of the roll, a time program control line comprising a strip of opaque material overlying the said chart, a carrier mounted for travel along the chart in a direction transverse to the direction of movement of the chart, an electric motor geared to said carrier, and photo-sensitive means carried by said carrier for controlling the operation of said motor.

11. An apparatus for controlling operations in keeping with a pre-determined time control program, said apparatus comprising a time chart, means for driving the chart in one direction, a stationary scale mounted adjacent the chart and extending transversely in said direction, a carrier mounted for movement lengthwise of the scale, an indicator on the carrier movable along the scale, a time program control line on said chart, a two phase reversible electric motor, means providing driving connections between the motor and the said carrier, an electrical control system controlling the operation of said motor, said system comprising thyratrons, the motor having phase windings in the plate circuits respectively of the thyratrons, electro-responsive control means for the carrier including electrical point contacts bearing on the chart and arranged in a row transverse to the direction of the movement of the chart, said time program control line consisting of electrically conducting material and being of the width to span the said contact points and means providing electrical connections between the control grids of the thyratrons and the said control means, and thereby operable to control the operation of the motor and cause the said contacts to follow the said control line.

12. The apparatus defined in claim 10, the said photo-sensitive means including photo cells adapted to cooperate with said opaque strip and positioned to register with said slot.

13. Apparatus for controlling operations in keeping with a predetermined time control program, said apparatus comprising a transparent chart, means for driving the chart in one direction, a stationary scale mounted adjacent to the chart and extending transversely to said direction, a carrier mounted for movement lengthwise of the scale, an indicator on the carrier moveable along the scale, a control line consisting of a strip of opaque material formed on said transparent chart, a two-phase reversible electric motor, means providing driving connections between the motor and said carrier, an electrical control system controlling the operation of said motor, said system comprising thyratrons, the motor having phase windings in the plate circuits respectively of the thyratrons, electro-responsive control means including photo cells carried by the carrier and moveable along said strip, said strip being of a width to bridge said photocells, and means providing electrical connections between the control grids of the thyratrons and said control means, and thereby operable to control the operation of the motor and cause said photocells to follow said control line.

References Cited in the file of this patent

UNITED STATES PATENTS

| | | |
|---|---|---|
| 2,354,391 | McCourt | July 25, 1944 |
| 2,529,490 | Field | Nov. 14, 1950 |
| 2,744,224 | Bode | May 1, 1956 |
| 2,838,683 | Munro | June 10, 1958 |
| 2,835,858 | Moseley | May 20, 1958 |
| 2,837,706 | Glassey | June 3, 1958 |